US006988767B2

(12) United States Patent
Schlachter et al.

(10) Patent No.: US 6,988,767 B2
(45) Date of Patent: Jan. 24, 2006

(54) REMOVABLE ROOF ASSEMBLY FOR A MOTOR VEHICLE

(75) Inventors: Reimund Schlachter, Muehlacker (DE); Andre Scholz, Wiernsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/716,941

(22) Filed: Nov. 20, 2003

(65) Prior Publication Data

US 2004/0150252 A1    Aug. 5, 2004

(30) Foreign Application Priority Data

Nov. 20, 2002   (DE)   ................................. 102 54 131

(51) Int. Cl.
*B60J 7/11*   (2006.01)
(52) U.S. Cl. ................. 296/218; 296/224; 296/216.09; 296/220.01; 292/DIG. 5
(58) Field of Classification Search ............... 296/218, 296/224, 216.09, 220.01; 292/DIG. 5
See application file for complete search history.

(56) References Cited

U.S. PATENT DOCUMENTS

| 3,476,437 | A | * | 11/1969 | Schroeder et al. | .......... 296/218 |
| 3,494,659 | A | | 2/1970 | Trenkler | |
| 3,683,993 | A | * | 8/1972 | Perks | ............. 160/37 |
| 4,346,932 | A | | 8/1982 | Iwata et al. | |
| 4,582,358 | A | | 4/1986 | Draper | ............ 296/213 |
| 4,830,426 | A | * | 5/1989 | Schlachter et al. | ......... 296/121 |
| 5,110,178 | A | | 5/1992 | Love | |
| 5,501,052 | A | | 3/1996 | Saji | |
| 6,059,356 | A | * | 5/2000 | Hoelzel et al. | ............ 296/218 |

FOREIGN PATENT DOCUMENTS

| DE | 1 580 535 | | 12/1970 | |
| DE | 1630940 | A | 7/1971 | |
| DE | 8521512 | U | 12/1985 | |
| DE | 41 37 344 | | 5/1994 | |
| DE | 9406435 | U | 6/1994 | |
| DE | G9406435.0 | * | 7/1994 | ................ 296/218 |
| GB | 1 162 627 | | 8/1969 | |
| GB | 1162627 | * | 8/1969 | ................ 296/218 |
| GB | 2304647 | A | 3/1997 | |
| JP | 03128725 | | 5/1991 | |
| JP | 05112135 | | 5/1993 | |

OTHER PUBLICATIONS

European Search Report mailed Mar. 5, 2004.
German Office Action mailed Dec. 17, 2003 and an English-language translation.

* cited by examiner

*Primary Examiner*—Dennis H. Pedder
(74) *Attorney, Agent, or Firm*—Crowell & Moring LLP (57) ABSTRACT

A removable roof is provided which intended for a motor vehicle passenger car, which covers roof and opening between a windshield frame and a body structure of a vehicle body which extends, for example, behind vehicle occupants seats. The removable roof is formed of a dimensionally stable material and is held in position, on the one side, by means of a form-lockingly acting fixing system and, on the other side, by means of a locking system. So that, while the mounting and demounting are simple, the roof is securely fastened to the vehicle body, the roof comprises two roof elements which are fitted together without hinges in a longitudinal center plane, each roof element cooperating with the windshield frame, by means of a first fixing device and a second fixing device of the fixing system, and with the vehicle body frame structure by means of a locking device of the locking system.

20 Claims, 8 Drawing Sheets

REMOVABLE ROOF ASSEMBLY FOR A MOTOR VEHICLE

BACKGROUND AND SUMMARY OF THE INVENTION

This application claims the priority of application number 10254131.0 filed in Germany on Nov. 20, 2002, the disclosure of which is expressly incorporated by reference herein.

The invention relates to a removable roof for a motor vehicle. Preferred embodiments of the invention relate to a removable roof for a motor vehicle passenger car, which covers an opening between a windshield frame and a vehicle body frame structure of a body of the passenger car extending behind vehicle occupant seats, said roof comprising dimensionally stable material and, on the one hand, is held in position by a form-lockingly acting fixing system and, on the other hand, by a locking system.

The subject matter of this application is related to commonly assigned application Ser. Nos. 10/716,867; 10/716,942; and 10/716,943, filed herewith and based on respective German application Nos. 10254108.6; 10254130.2; and 10254132.9.

A manually mountable or demountable roof for a passenger car is known from German Patent Document DE 41 37 344 A1. It extends between an upper member part of a windshield frame and a vehicle body frame structure behind backrests of vehicle seats. The body frame structure comprises a rollover bar system which spans a vehicle occupant compartment of the passenger car transversely to the longitudinal direction of the vehicle. The roof is formed of a dimensionally stable material and is constructed as a one-piece component, in which case, by means of a fixing system and a locking system, the roof is held in position on the member part of the windshield frame and on the body structure respectively.

From British Patent Document GB 1,162,627, a removable roof of a passenger car is known which has articulated side members. As a result of these side members, the roof can be changed into a folded and into a stretched position respectively, in which stretched position, the roof with corresponding supporting bodies engages in each case in an approximately U-shaped groove on a windshield frame and on a rollover bar respectively.

German Patent Document DE 1 580 535 (corresponding U.S. Pat. No. 3,494,659) relates to a folding top for motor vehicles which is detachably fastened to a windshield frame and a rollover bar spanning a vehicle occupant compartment. In this case, the roof interacts with the windshield frame by means of an inflexible locking system and with the rollover bar by means of an elastic fixing system.

Furthermore, U.S. Pat. No. 4,582,358 relates to a body for a passenger car, in which case a connection member is provided between a windshield frame and a rearward body structure, which connection member extends in a longitudinal center plane of the passenger car and bounds roof openings. Detachable roof elements can be inserted into the roof openings and rest independently and separately from one another on the connection member.

It is an object of the invention to provide a removable roof for a passenger car which, by means of a fixing system and a locking system, is securely held on a windshield frame and on a vehicle body frame structure extending behind vehicle seats. However, in this case, it should also be ensured that the handling of the roof is simple for the mounting and the demounting and that the fixing system and the locking system are distinguished by a good functioning and by easily implementable components.

According to certain preferred embodiments of the invention, this object is achieved by providing a removable roof for a motor vehicle passenger car, which covers an opening between a windshield frame and a vehicle body frame structure of a body of the passenger car extending behind vehicle occupant seats, said roof comprising dimensionally stable material and, on the one hand, is held in position by a form-lockingly acting fixing system and, on the other hand, by a locking system, wherein the roof comprises two roof elements fitted together without hinges in a longitudinal center plane of the passenger car, each roof element cooperating with the windshield frame by a first fixing device and a second fixing device of the fixing system, and cooperating with the vehicle body frame structure by a locking device of the locking system.

Important advantages achieved by means of the invention are that the roof elements, in conjunction with the first fixing device and the second fixing device as well as the locking system, easily withstand the occurring stress which is a result of the given construction of the windshield frame and of the rearward vehicle body frame structure which represents, for example, a rollover bar system. Because of this construction, the manual mounting measures for fastening the roof elements on the passenger car and detaching these roof elements from the latter can be carried out rapidly and without effort, for example, by one person. The components of the first and second fixing devices can be changed at acceptable expenditures and can be accommodated at the roof elements or the windshield frame. The same correspondingly applies to the locking system which is in each case operative between the roof elements and the rearward vehicle body structure.

Other objects, advantages and novel features of the present invention will become apparent from the following detailed description of the invention when considered in conjunction with the accompanying drawings.

DETAILED DESCRIPTION OF THE DRAWINGS

Figure 1:
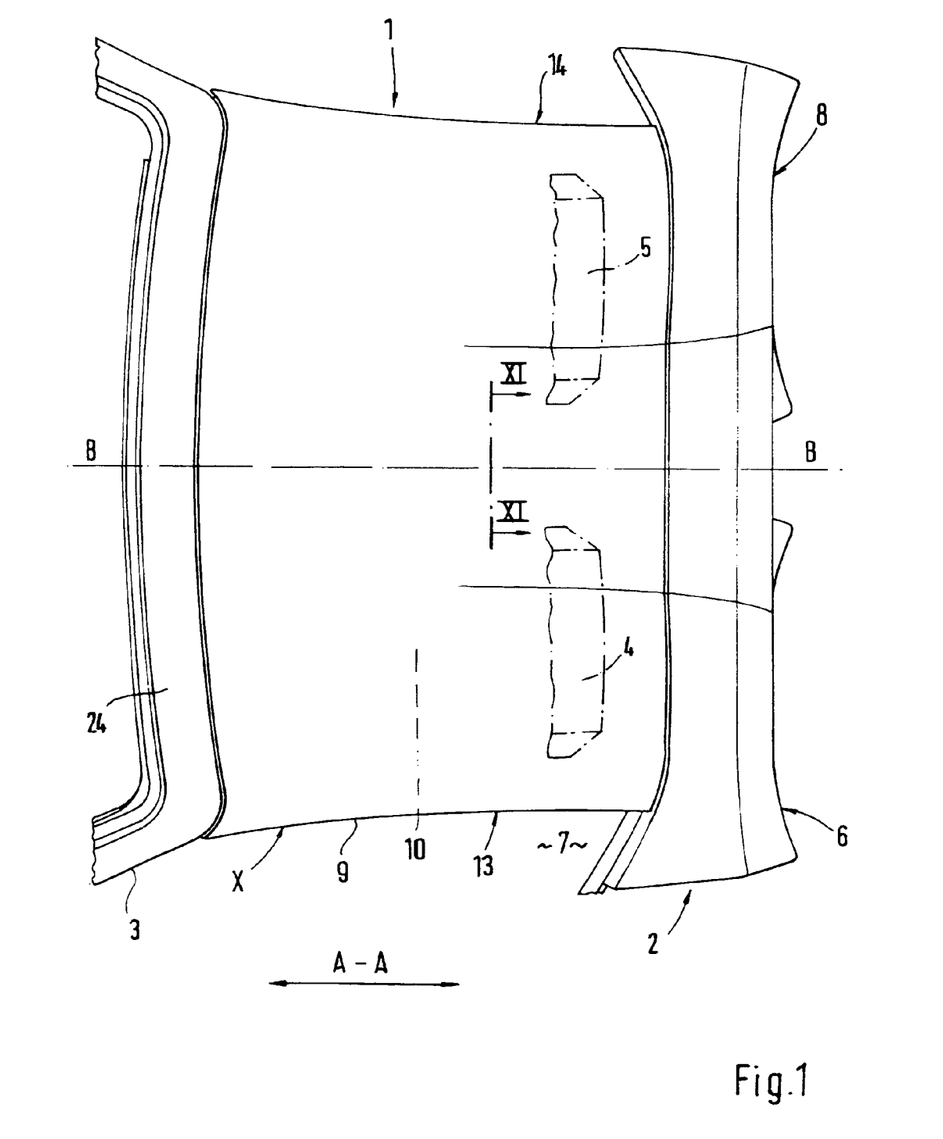
FIG. 1 is a partial top view of a passenger car with a removable roof constructed according to a preferred embodiment of the invention.
Figure 2:
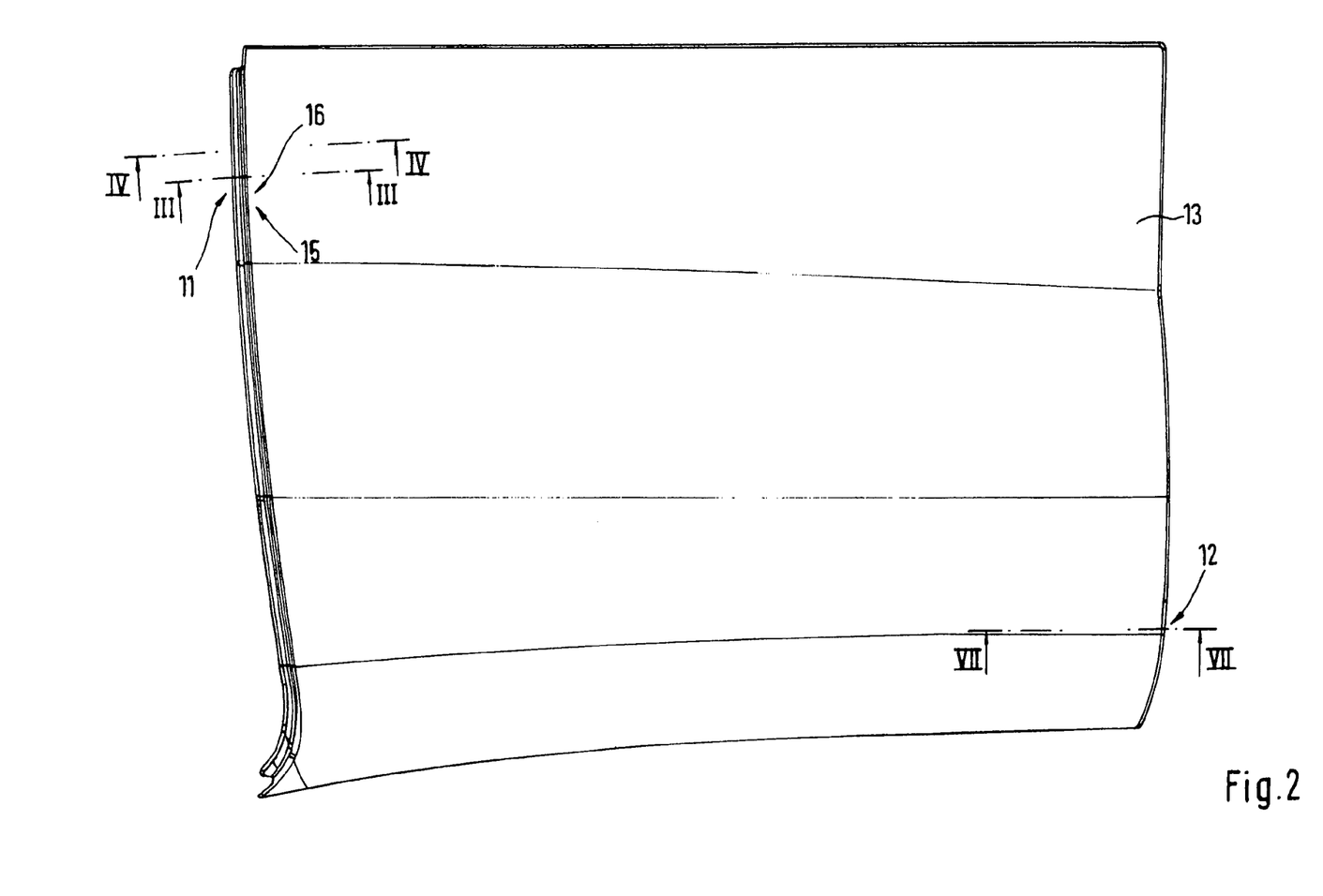
FIG. 2 is a view of an enlarged detail X of FIG. 1.

A passenger car 1 comprises an open vehicle body 2 having a windshield frame 3 and a rearward body frame structure 6 extending behind vehicle seats 4, 5, which body frame structure 6 comprises a rollover bar system 8 spanning a vehicle occupant compartment 7. The area between the windshield frame 3 and the rollover bar system 8 is free of supporting member structures which extend in the longitudinal direction A—A of the vehicle and reinforce the vehicle body 2. This means that all bending and torsion moments affecting the vehicle body 2 are absorbed by a floor system with its supporting members, which is not shown, so that relative movements between the windshield frame 3 and the rollover bar system 8, which occur, for example, during the driving operation of the passenger car, are taken into account in the case of the connection of a dimensionally stable removable roof 9 with the latter by constructive measures.

Figure 3:
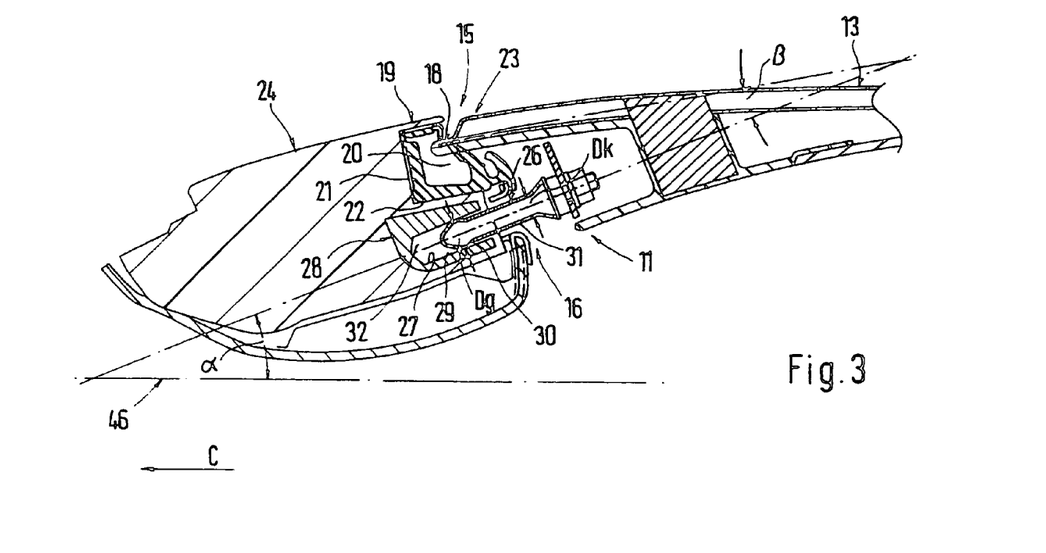
FIG. 3 is an enlarged sectional view according to Line III—III of FIG. 2.
Figure 7:
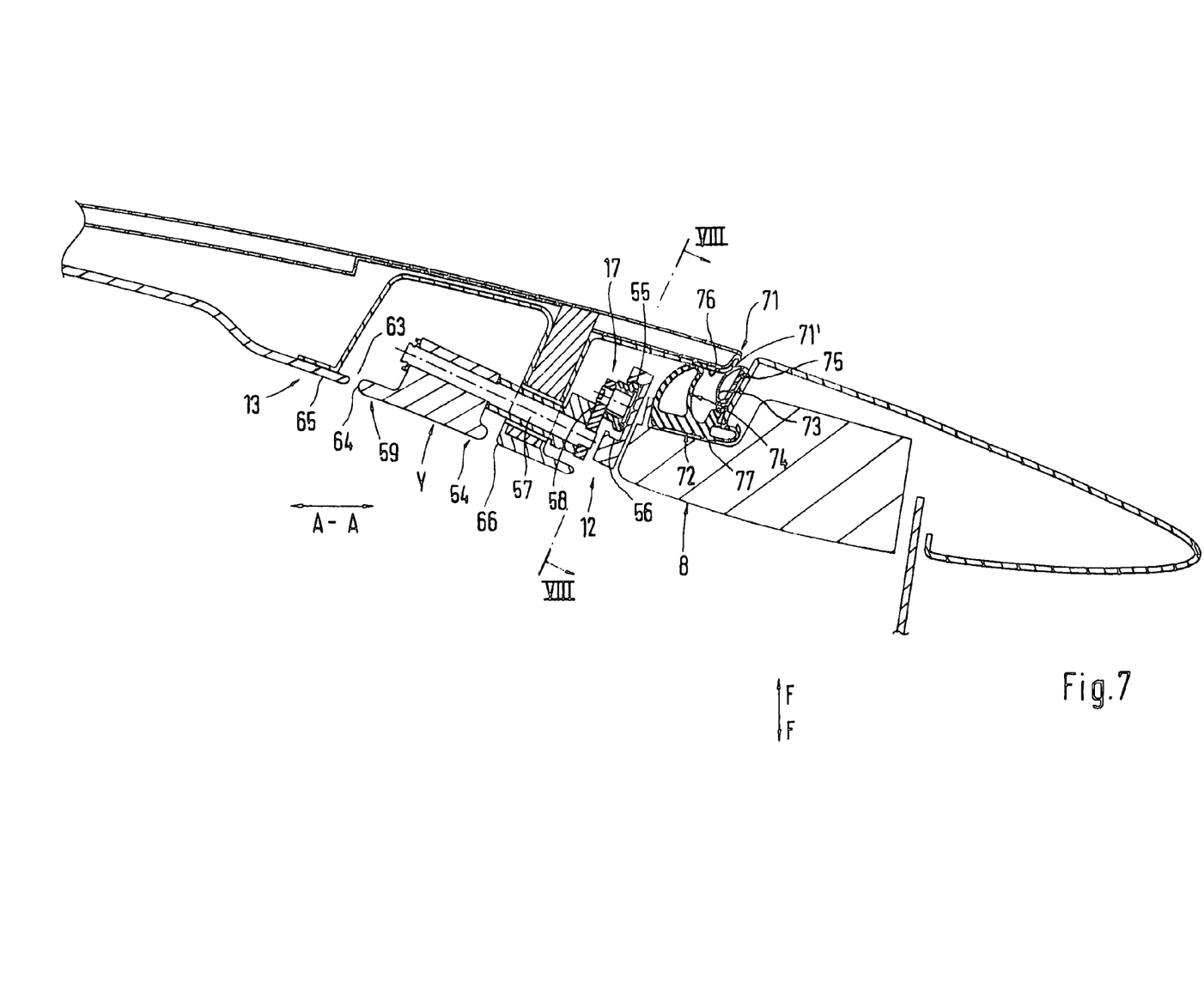
FIG. 7 is a sectional view according to Line VII—VII of FIG. 2.
Figure 8:
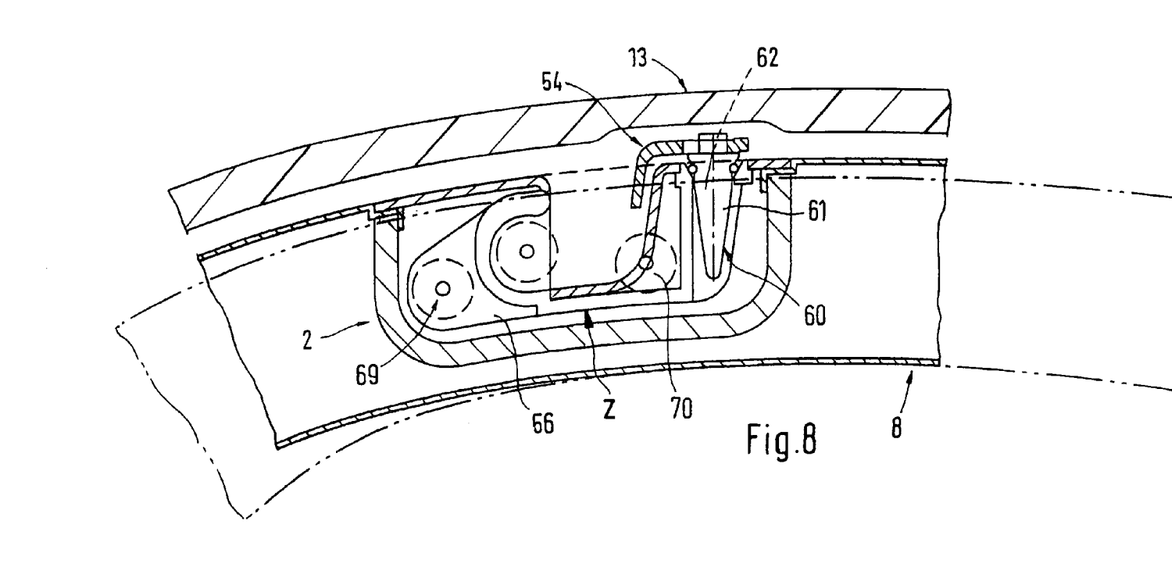
FIG. 8 is a sectional view according to Line VIII—VIII of FIG. 7.

The roof 9 consists of a firm plastic material, for example, of a highly stressable type, particularly a fiber-reinforced plastic material—CFK—, covers an opening 10 between the windshield frame 3 and the rollover bar system 8 or rearward body frame structure 6, and is connected with the vehicle body 2 by means of a form-lockingly operating fixing system 11—FIG. 3—and a locking system 12—FIG. 7. Furthermore, the roof 9 comprises two roof elements 13, 14 which are fitted together without connecting elements, thus without hinges, in a longitudinal center plane B—B. Each roof element, for example, 13, interacts by means of a first fixing device 15 and a second fixing device 16 of the fixing system 11 with the windshield frame 3 and a locking device 17 of the locking system 12 with the rollover system 8.

Figure 12:
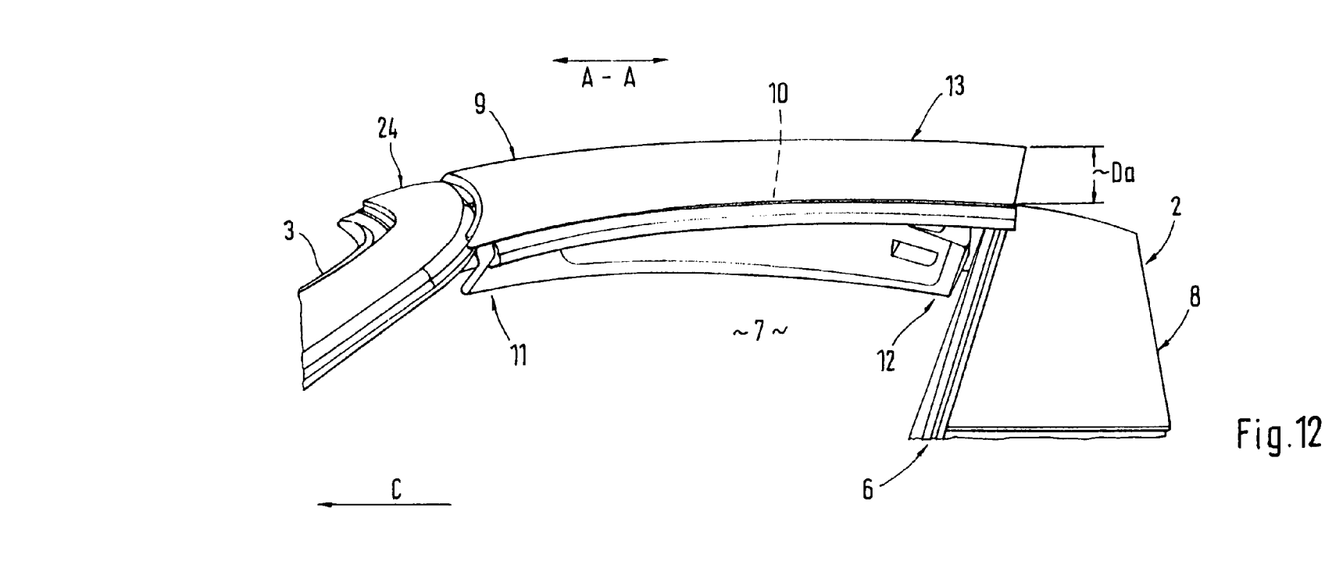
FIG. 12 is a partial lateral view of the passenger car according to FIG. 1.

The roof element 13 and the roof element 14 can be stored in a stacked form in a storage space, which is not shown, of the passenger car 1; when the passenger car is in the open condition. For mounting the roof element 13, it is engaged with the fixing devices 15 and 16 by means of a movement directed in the driving direction C. In this case, the roof element 13 is slightly lifted, that is, by the extent Da—FIG. 12—, with respect to the rollover bar system 8. After a defined lowering of the roof element 13, the latter takes up its design position, and the locking device 17 is operative. The demounting of the roof element 13 takes place in the reverse sequence. Comparable mounting steps are required for the mounting or detaching of the other roof element 14.

Figure 4:
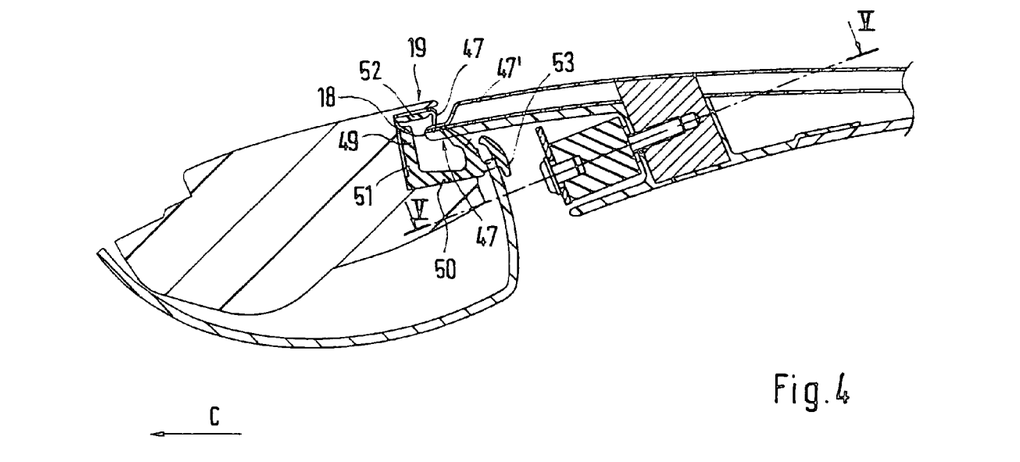
FIG. 4 is an enlarged sectional view according to Line IV—IV of FIG. 2.

According to the longitudinal sectional views of FIGS. 3 and 4, the first fixing device 15 is equipped with a flange-type forward roof extension 18 of the roof element 13 which extends in the longitudinal direction A—A of the vehicle and reaches under an exterior leg wall 19 of an open U-shaped receiving device 20 oriented toward the roof element 13. The receiving device 20 also comprises a web wall 21 as well as an interior leg wall 22, and is a component of an upper cross member 24 of the windshield frame 3. With respect to an exterior wall 23 of the roof element 13 extending flush to the exterior leg wall 19, the roof extension 18 is constructed as a step 25.

The second fixing device 16 has a bearing journal 26 which projects into a receiving bore 27, which bearing journal 26 is provided on the roof element 13, and which receiving bore 27 is provided on the cross member 24 of the windshield frame 3. The receiving bore 27 is worked into a metallic insert 28 which is integrated into the windshield frame 3 consisting, for example, of a fiber-reinforced plastic material, or the cross member 24, in such a manner that the above-mentioned insert 28 is embedded in the cross member 24. Adjacent to its free end 29, the bearing journal 26 has a molded-on guiding device 30 of a largest diameter Dg, from which merges, on one side, into a shaft 31 with a smaller diameter Dk and from which, on the other side, it tapers off as a conical point 32.

Figure 5:
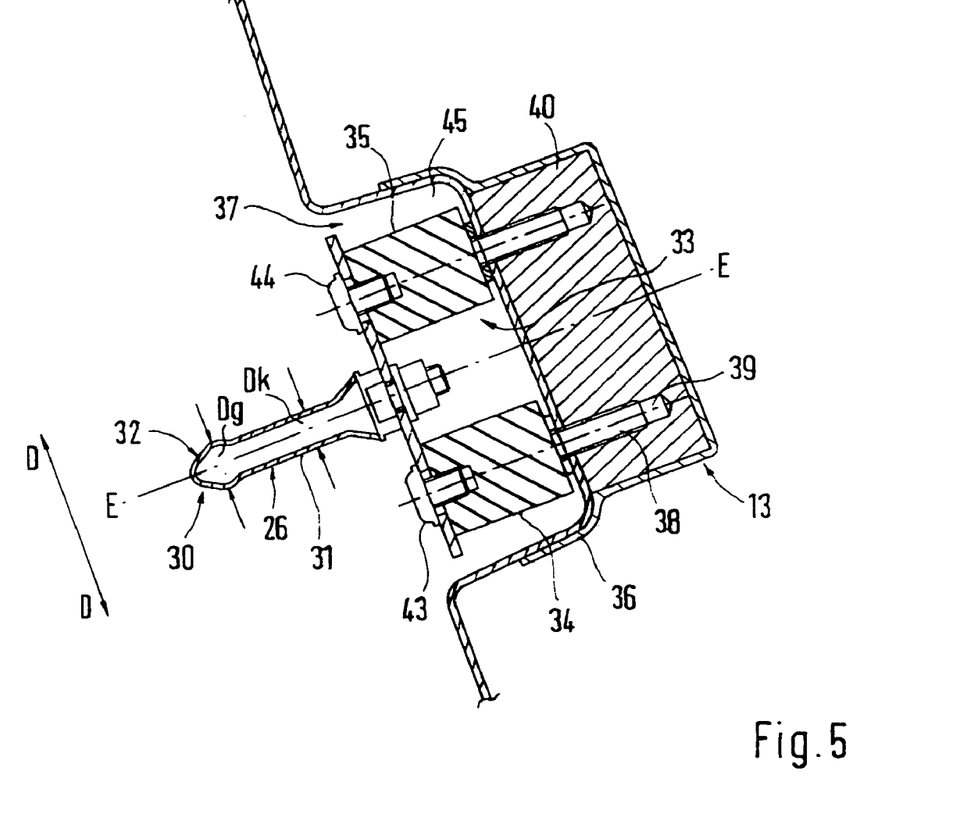
FIG. 5 is a sectional view according to Line V—V of FIG. 4.
Figure 6:
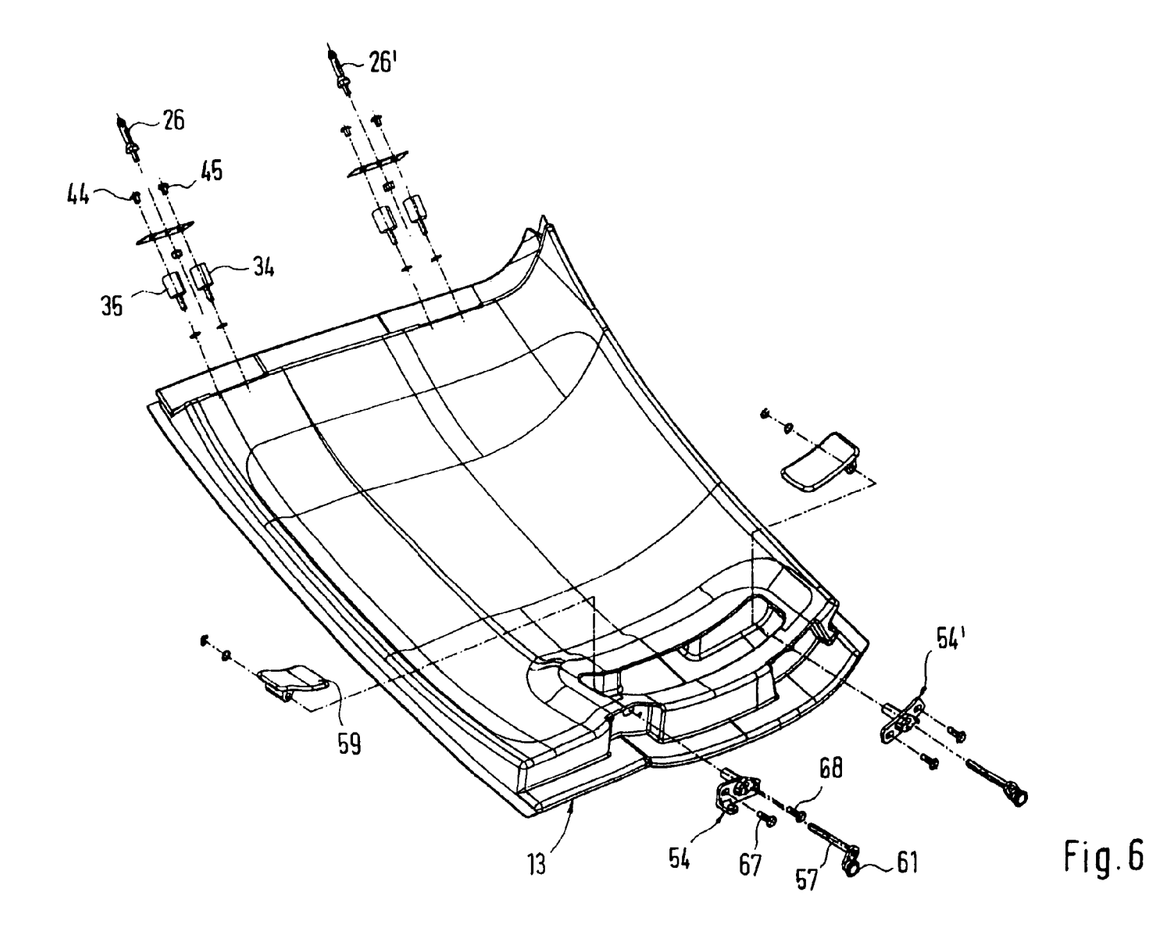
FIG. 6 is a rear diagonal view of a roof element according to FIG. 1, but rotated by 180°.

FIGS. 4 and 5 illustrate that the bearing journal 26 is fastened to the roof element 13 by means of an elastic device 33 which is provided with two elastic bodies 34 and 35 spaced in the transverse direction D—D of the vehicle and preferably having a circular-cylindrical cross-section which, on the one hand, are held on a cross member 36 of the roof element 13 and, on the other hand, are connected with a plate-type holding member 37 for the bearing journal 26. Each elastic body, for example, 34, rests by means of a threaded pin 38 in a threaded bore 39 of a metallic insert 40 which is worked into the cross member 36 of the roof element 13 in a fully covered manner. The bearing journal 26 extends in a longitudinal center plane E—E between the elastic bodies 34 and 35 and is held by means of a threaded pin 41 and a screw nut 42 on the holding member 37, the holding member 37 being fastened by means of screws 43 and 44 on the elastic bodies 34 and 35. In order to accommodate the elastic bodies 34 and 35, possibly also the holding member 37, in a favorable manner in the roof element 13, specifically in a largely sunk manner, the latter is provided with a recess 45. FIG. 6 illustrates an embodiment according to which two bearing journals, specifically 26 and 26', are provided for each roof element, for example, 14, which bearing journals 26 and 26' cooperate with corresponding receiving bores of the windshield frame 3 or the cross member 24.

In order to ensure a targeted function of the first fixing device 15 and of the second fixing device 16, in the longitudinal sectional view according to FIG. 3, the bearing journal 26 extends at an acute angle α (approximately 15° to 25°) with respect to the horizontal line 46. In this case, the bearing journals 26 of the second fixing device 16 and the forward flange-type roof extension 18 extend at an acute angle β (approximately 8° to 12°) with respect to one another.

According to FIG. 4, a first sealing section 47 is arranged between the exterior leg wall 19 and the roof extension 18, and a second sealing section 47' is arranged between an interior wall 48 of the roof element 13 and the interior leg wall 22 of the U-shaped receiving device 20. The first sealing section 47 and the second sealing section 47' are components of a sealing body 49 which extends by means of fitting walls 50, 51, 52 along the exterior leg wall 19, the web wall 21 and the interior leg wall 22 of the receiving device 20. Another essential characteristic of the sealing body 49 is a web 53 which extends away from the second sealing section 47' and, together with the above-mentioned second sealing section 47', forms a type of groove for the targeted drainage of collected water.

FIG. 7 illustrates that the locking device 17 of the locking system 12 has an operating device 54 with a locking pin 55 which cooperates with a closing crank 56 such that, viewed in the vertical direction F—F of the vehicle, the roof element 13 is tensioned against the rollover bar system 8. The operating device 54 is mounted on the roof element 13; the closing crank 56 is mounted on the rollover bar system 8. The locking pin 55 is part of a crank arm 58 connected with a swivel shaft 57 aligned in the longitudinal direction A—A of the vehicle, to which crank arm 58 a manual lever 59 is applied. So that, during the mounting, the roof element 13 is aligned in the correct position with respect to the rollover bar system 8, a fixing system 60 is operative between the operating device 54 and the closing crank 56, which fixing system 60 has an upright, for example, conical pin 61 and a corresponding receiving opening 62 which is in an operative connection with the latter. In the illustrated embodiment, the pin 61 is mounted on the operating device 54 and the receiving opening 62 is provided on the closing crank 56.

Figure 9:
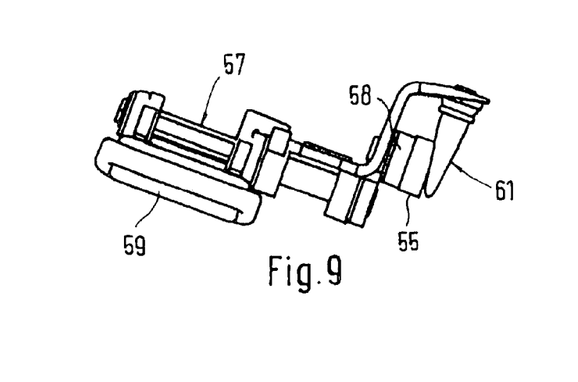
FIG. 9 is a view of a detail Y of FIG. 7.
Figure 10:
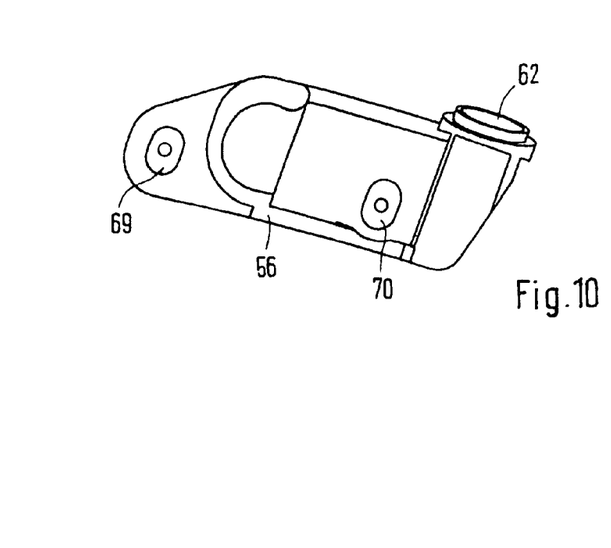
FIG. 10 is a view of a detail Z of FIG. 8.

The manual lever 59 of the locking device 17 is accommodated in a recess 63 of the roof element 13. In this case, the manual lever comprises a control plate 64 which is arranged flush with respect to the surfaces of interior walls 65 and 66 of the roof element 13 which bound the recess 63. In order to achieve a simple construction of the locking device 17, the manual lever 59, the swivel shaft 57 and the pin 61 are constructionally combined—FIG. 9—and fastened by means of screws 67, 68 at the roof element 13—FIG. 6. The constructional combination correspondingly applies to the receiving opening 62 and the closing crank 56 which, however, are held by means of screws 69, 70 on the rollover bar system 8. For each roof element 13 or 14, two mutually spaced operating devices 54 and 54' may be provided—FIG. 6—which are engaged in the pertaining closing cranks 56.

FIG. 7 illustrates how, by means of a rearward roof extension 71, the roof element 13 projects beyond a groove 72 of the rollover bar system 8 and, by means of a first sealing section 73 and second sealing section 74, extends to the groove 72 or the rollover bar system 8. In this case, the first sealing section 73 is provided between a free end 71' of the roof extension 71 and an upright wall 75 of the rollover bar system 8. In contrast, the second sealing section 74 is operative between an interior wall 76 of the roof extension 71 and a wall 77 of the groove 72 aligned in the direction of the roof extension 71.

Figure 11:
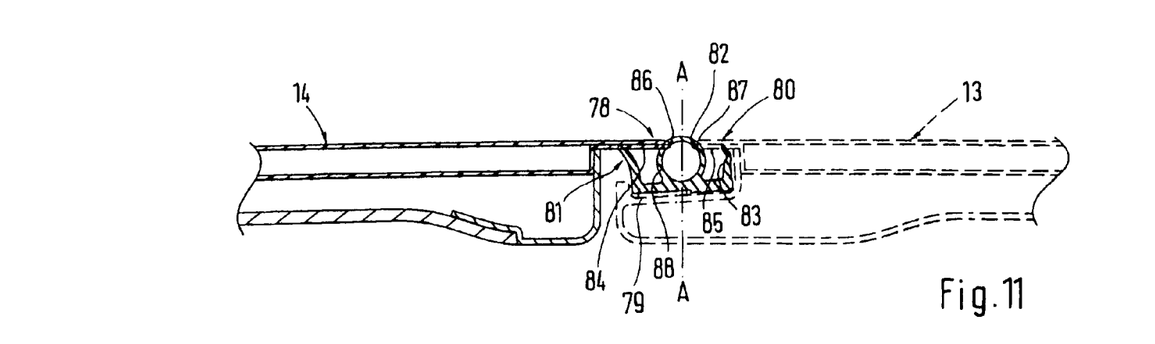
FIG. 11 is an enlarged sectional view according to Line XI—XI of FIG. 1.

As mentioned above, the two roof elements 13,14 are fitted together along the longitudinal center plane B—B. Here, the one roof element, specifically 14, by means of a first lateral roof element extension 78, projects beyond a groove 79 of the other roof element, specifically 13—FIG. 11. The roof element 13 is provided with a second lateral roof element extension 80 which also extends beyond the groove 79. For sealing off the roof elements 13, 14 in the area of the longitudinal center plane B—B, a first sealing section 81, a second sealing section 82 and a third sealing section 83 are operative. The first sealing section 81 and the third sealing section 83 are constructed in the manner of sealing lips which interact with interior walls 84 and 85 of the roof element extensions 78 and 80. The second sealing section 82 extends between the roof elements 13, 14 and is constructed as a hollow sealing body with a circular cross-section on which ends 86, 87 of the first lateral roof element extension 78 and of the second lateral roof element extension 80 are supported approximately tangentially. Finally, the three sealing sections 81, 82 and 83 are components of a sealing body 88 which is made of one piece and is held in position in the groove 79 of the roof element 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removable roof for a motor vehicle passenger car, which covers an opening between a windshield frame and a vehicle body frame structure of a body of the passenger car extending behind vehicle occupant seats, said roof comprising dimensionally stable material and being held in position, on the one hand, by a form-lockingly acting fixing system and, on the other hand, by a locking system, wherein the roof comprises two roof elements fitted together without hinges in a longitudinal center plane of the passenger car, each roof element cooperating with the windshield frame by a first fixing device and a second fixing device of the fixing system, and cooperating with the vehicle body frame structure by a locking device of the locking system, wherein the first fixing device has a flange-type forward roof extension of the roof element of the roof which extends in a longitudinal direction of the vehicle and reaches under an exterior leg wall of an open U-shaped receiving device of an upper cross member of the windshield frame, which receiving device is oriented toward the roof element, wherein the second fixing device comprises at least one bearing journal which projects into a receiving bore, and wherein the bearing journal is held in position by means of an elastic device on the roof element.

2. Removable roof according to claim 1, wherein the elastic device has two elastic bodies which are spaced in a transverse direction of the vehicle and have circular-cylindrical cross-sections, which, on first sides, are held on a cross member of the roof element, and which, on their other sides, are connected with a plate-type holding member for the bearing journal.

3. Removable roof according to claim 2, wherein each elastic body rests by a threaded pin in a threaded bore in a metallic insert of the roof element.

4. Removable roof according to claim 2, wherein the holding member is connected by means of screws with the elastic bodies.

5. Removable roof according to claim 2, wherein the bearing pin extends in a longitudinal center plane between the elastic bodies and, by means of a threaded pin and a screw nut, is connected with the holding member.

6. Removable roof according to claim 2, wherein the elastic device with the elastic bodies and the holding member is arranged at least in a largely sunk manner in a recess of the roof element.

7. Removable roof according to claim 2, wherein for each roof element, two bearing pins with elastic bodies are provided which cooperate with corresponding receiving bores of the windshield frame.

8. Removable roof for a motor vehicle passenger car, which covers an opening between a windshield frame and a vehicle body frame structure of a body of the passenger car extending behind vehicle occupant seats, said roof comprising dimensionally stable material and being held in position, on the one hand, by a form-lockingly acting fixing system and, on the other hand, by a locking system, wherein the roof comprises two roof elements fitted together without hinges in a longitudinal center plane of the passenger car, each roof element cooperating with the windshield frame by a first fixing device and a second fixing device of the fixing system, and cooperating with the vehicle body frame structure by a locking device of the locking system, wherein the first fixing device has a flange-type forward roof extension of the roof element of the roof which extends in a longitudinal direction of the vehicle and reaches under an exterior leg wall of an open U-shaped receiving device of an upper cross member of the windshield frame, which receiving device is oriented toward the roof element, wherein the second fixing device comprises at least one bearing journal which projects into a receiving bore, and wherein, in a longitudinal sectional view, the bearing journal extends at an acute angle with respect to a horizontal line.

9. Removable roof for a motor vehicle passenger car, which covers an opening between a windshield frame and a vehicle body frame structure of a body of the passenger car extending behind vehicle occupant seats, said roof comprising dimensionally stable material and being held in position, on the one hand, by a form-lockingly acting fixing system and, on the other hand, by a locking system, wherein the roof comprises two roof elements fitted together without hinges in a longitudinal center plane of the passenger car, each roof element cooperating with the windshield frame by a first fixing device and a second fixing device of the fixing system, and cooperating with the vehicle body frame structure by a locking device of the locking system, wherein the first fixing device has a flange-type forward roof extension of the roof element of the roof which extends in a longitudinal direction of the vehicle and reaches under an exterior leg wall of an open U-shaped receiving device of an upper cross member of the windshield frame, which receiving device is oriented toward the roof element, wherein the second fixing device comprises at least one bearing journal which projects into a receiving bore, and wherein the bearing journal of the second fixing device and the flange-type roof extension of the first fixing device extend at an acute angle with respect to one another in a longitudinal sectional view.

10. Removable roof for a motor vehicle passenger car, which covers an opening between a windshield frame and a vehicle body frame structure of a body of the passenger car extending behind vehicle occupant seats, said roof comprising dimensionally stable material and being held in position, on the one hand, by a form-lockingly acting fixing system and, on the other hand, by a locking system, wherein the roof comprises two roof elements fitted together without hinges in a longitudinal center plane of the passenger car, each roof element cooperating with the windshield frame by a first fixing device and a second fixing device of the fixing system, and cooperating with the vehicle body frame structure by a locking device of the locking system, wherein along the longitudinal center plane of the roof, the one roof element by means of a first lateral roof element extension projects so as to overlap a groove of the other roof element which, by means of a second lateral roof element extension, also projects so as to overlap the groove, and wherein, for sealing-off the roof elements along the longitudinal center plane, a first sealing section, a second sealing section and a third sealing section are operative.

11. Removable roof according to claim 10, wherein the first sealing section and the third sealing section are constructed as sealing lips which interact with interior walls of the first lateral roof element extension and of the second lateral roof element extension respectively.

12. Removable roof according to claim 10, wherein the second sealing section extends between the roof elements and is constructed as a sealing body with a circular cross-section, on which ends of the first lateral roof element extension and of the second lateral roof element extension are supported.

13. Removable roof according to claim 10, wherein the sealing sections are components of a sealing body which is made of one piece and is held in position in the groove of the other roof element.

14. Removable roof according to claim 11, wherein the sealing sections are components of a sealing body which is made of one piece and is held in position in the groove of the other roof element.

15. Removable roof according to claim 12, wherein the sealing sections are components of a sealing body which is made of one piece and is held in position in the groove of the other roof element.

16. A passenger vehicle roof assembly operable to cover a vehicle roof opening between a windshield frame and a vehicle body frame structure, said roof assembly comprising:

first and second dimensionally stable roof elements configured to be fitted together in a longitudinal center-plane of the vehicle, a fixing system for accommodating form locking fixing of the roof elements at the windshield frame, said fixing system including a pair of spaced first and second fixing devices for each roof element, and a locking system operable to lock the roof elements at the vehicle body frame structure, said locking system including a locking device for each roof element, wherein the first fixing device has a flange-type forward roof extension of the roof element of the roof which extends in a longitudinal direction of the vehicle and reaches under an exterior leg wall of an open U-shaped receiving device of an upper cross member of the windshield frame, which receiving device is oriented toward the roof element, wherein the second fixing device comprises at least one bearing journal which projects into a receiving bore, and wherein the bearing journal is held in position by means of an elastic device on the roof element.

17. A roof assembly according to claim 16, wherein the elastic device has two elastic bodies which are spaced in a transverse direction of the vehicle and have circular-cylindrical cross-sections, which, on first sides, are held on a cross member of the roof element, and which, on their other sides, are connected with a plate-type holding member for the bearing journal.

18. A passenger vehicle roof assembly operable to cover a vehicle roof opening between a windshield frame and a vehicle body frame structure, said roof assembly comprising:

first and second dimensionally stable roof elements configured to be fitted together in a longitudinal center-plane of the vehicle, a fixing system for accommodating form locking fixing of the roof elements at the windshield frame, said fixing system including a pair of spaced first and second fixing devices for each roof element, and a locking system operable to lock the roof elements at the vehicle body frame structure, said locking system including a locking device for each roof element, wherein along the longitudinal center plane of the roof, the one roof element by means of a first lateral roof element extension projects so as to overlap a groove of the other roof element which, by means of a second lateral roof element extension, also projects so as to overlap the groove, and wherein, for sealing-off the roof elements along the longitudinal center plane, a first sealing section, a second sealing section and a third sealing section are operative.

19. A roof assembly according to claim 18, wherein the first sealing section and the third sealing section are constructed as sealing lips which interact with interior walls of the first lateral roof element extension and of the second lateral roof element extension respectively.

20. A roof assembly according to claim 18, wherein the sealing sections are components of a sealing body which is made of one piece and is held in position in the groove of the other roof element.

* * * * *